June 12, 1928.　　　　　　　　　　　　　　　　1,673,675
G. C. E. F. HANCIAU
PROCESS FOR THE RECOVERY, SEPARATION, OR EXTRACTION OF GOLD, PLATINUM,
AND OTHER METALS, APPLICABLE ALSO FOR THE SEPARATION OF PRECIOUS
STONES FROM THE EARTH OR MATERIAL CONTAINING THEM
Filed Sept. 25, 1923
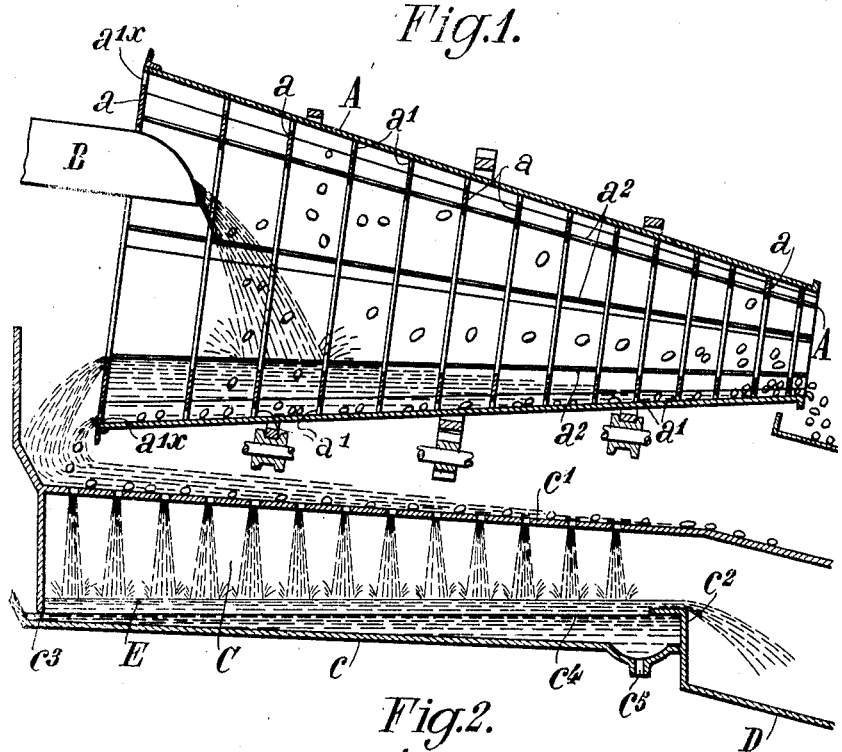
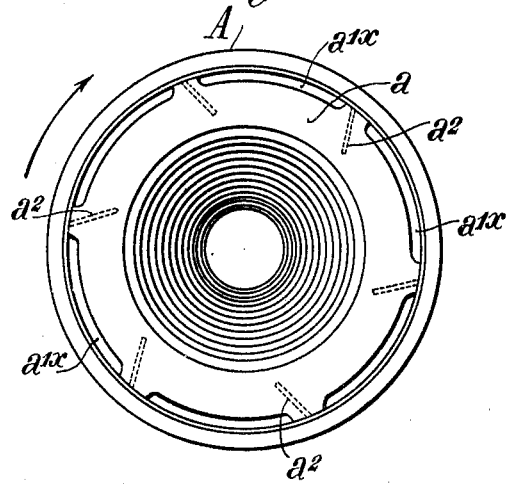
Inventor
Georges C.E.F. Hanciau
by Wilkinson + Giusta
Attorneys.

Patented June 12, 1928.

1,673,675

UNITED STATES PATENT OFFICE.

GEORGES CHARLES EDOUARD FRANÇOIS HANCIAU, OF PARIS, FRANCE.

PROCESS FOR THE RECOVERY, SEPARATION, OR EXTRACTION OF GOLD, PLATINUM, AND OTHER METALS, APPLICABLE ALSO FOR THE SEPARATION OF PRECIOUS STONES FROM THE EARTH OR MATERIAL CONTAINING THEM.

Application filed September 25, 1923, Serial No. 664,735, and in Great Britain October 9, 1922.

This invention relates to the recovery, separation, or extraction of gold, platinum and other metals or of precious stones, from the earth or other material containing them, wherein the earth or material containing the metal particles or precious stones is mixed with water and passed along a channel provided with a sieve or open-work bottom through which the water, sand and metal particles or stones pass and are subsequently further treated and separated, the larger waste material passing away over the end of the channel. In the case of gold, the latter is amalgamated by a layer of mercury into which the material is passed.

According to the present invention, which is particularly applicable to the treatment of alluvial deposits, I effect the separation in a very simple manner by causing the water containing the sand and metal particles— such as gold—to fall freely, and preferably in the form of sprays or jets, into a bath of dense liquid such as mercury, arranged at a considerable distance below, whereby the material plunging into the mercury, keeps it in a state of agitation and the gold becomes amalgamated therewith, while the lighter material such as sand and earth remains on the top of the liquid and passes away with the water over an overflow.

In the case of a metal or a mineral lighter than gold such as tin, where no amalgamation is possible, mercury can still be employed with advantage, on account of its action in assisting the classification or separation of the material by density, which is more satisfactorily achieved on a liquid bottom or base surface than upon a solid bottom as would be the case if no dense liquid were employed. In the case of precious stones the latter will generally sink through the dense liquid, while the sand and water will remain on the top and pass away over the overflow.

As already stated I arrange the mercury or heavy liquid, employed as the separator or collecting medium for the metals or stones, at some considerable distance below the sieve or equivalent device, so that the metal and small stones which pass with the sluice water through the sieve fall directly with added momentum into the dense liquid below the force of the fall thus breaking up or agitating the liquid and keeping it in motion and preventing any caking or accumulation of the sand or mud upon the surface.

The invention therefore is concerned with a process wherein the force of gravity and a dense collecting liquid not miscible with water are employed, in an apparatus of very simple construction.

Various apparatus have been used in the form of sluices and other devices in alluvial mining in particular, but many of them have the disadvantage that the mercury rapidly becomes covered with a thick layer of mud which isolates the mercury and thereby prevents some of the gold particles from reaching the mercury, and such metallic particles are thus carried away or removed with the mud, which can be retreated once or several times and still contain metal, and in consequence of this, in some cases, mercury treatment has been abandoned.

This drawback is obviated in my process and apparatus wherein the collecting liquid, mercury for example, is arranged in a shallow tank or receptacle which allows only a small depth of muddy water to remain on the top and by arranging a perforated grid or surface, through which the sluice water containing the material to be recovered, passes, at a height above the top of the tank, so that in falling from the perforated grid into the tank the water, sand and gold or other metal acquires sufficient momentum to pierce the thin layer of muddy water and to pass to the mercury below. At the same time the muddy water and mercury is agitated by the falling of the sand, stones, metal and water on to its surface, and this agitation is advantageous, as a better separation of metal particles in the mud is effected, and the flowing away of the supernatant mud and water is facilitated.

In order to remove stones and other large sized waste which may be present in the earth to be treated, I prefer as a preliminary step, to feed the latter into a sluice, which conducts it to a rotatory drum, preferably of conical shape and provided with a series of annular discs preferably at right angles to the axis of the drum, each of which is cut away at one or more places at its outer edge so as to provide narrow slots or channels through which the metal-containing earth and water can pass, while retaining in the drum the stones and other waste material.

In order to eject the latter from the drum I may provide fins, blades or shelves projecting inwardly from the inner surface of the drum or similar means formed and arranged in such manner as to progressively project the stones towards the outer end of the drum. Or instead of discs, I may provide the drum interior with a specially arranged blade or strip having cut away portions similarly to the discs.

The drum is so arranged that the bottom at the inlet end is on a lower level than the opposite end so that the sluice water while forming a layer on the bottom of the drum will overflow at the inlet end, from whence it is directed, on to the perforated grid or sieve above referred to.

The invention will now be described, more in detail, with reference to the accompanying drawings in which, Figure 1 represents a vertical section of one embodiment according to my invention. Figure 2 being an end view of the drum looking from the left hand side.

A is a rotatable drum of conical shape open at both ends, the larger end receiving the delivery end of the sluice B. Within the drum A, I arrange a number of annular discs $a$, each disc being cut away at a number of points in its periphery to constitute narrow channels $a'$ between the outer edge of the discs and the inner surface of the drum.

In addition I provide a series of longitudinal blades or shelves $a^2$ for a purpose to be hereinafter described.

The drum is provided with means, not shown, whereby it may be rotated about its longitudinal axis, and is so arranged that the inner edge of its largest disc $a$ is, when in its lowest position, slightly below the lowest point of the outlet $A'$ of the drum. Below the drum I arrange a box or chamber C comprising an inclined base $c$ and a perforated top or cover $c'$ which is preferably, as shown slightly downwardly inclined. This box is closed on all sides with the exception of the outlet side or where the upper edge of the wall $c^2$ is at a considerable distance below the grid $c'$ and thus provides an overflow opening for the contents and a considerable drop for the water and its contents from the grid to the tank. A small filling opening $c^3$ is provided at the other end of the box into which mercury, for example, is poured to constitute a collecting layer $c^4$ in the bottom of the box. D represents a conduit for the overflow water and mud.

In operation the alluvial earth or material containing the gold or other metal or precious stones to be separated and collected is charged into the sluice B in which a continuous flow of water is maintained. The mixture of earth and water is then delivered into the larger end of the rotating drum A where it falls to the bottom, the water together with the sand, particles of metal and small foreign particles passing through the narrow channels $a'$ and flowing out through the channels $a'^x$ while the stones and larger waste material contained in the alluvial earth, and which will not pass through the channels $a'$, are caught by the shelves $a^2$ and carried round to the upper part of the drum whence they fall off vertically into the next compartment constituted by two adjacent discs, until they arrive at the discharge end of the drum from whence they fall on to a conveyor or other receptacle. In this travel of the stones through the drum any clay in which the stones may be embedded will be removed therefrom, and thus any free gold which may be adhering to or contained in the clay will be retained and delivered to the collecting liquid. The discharge from the sluice B is so regulated that the water thus supplied cannot be wholly discharged through the channels $a'$ but will flow over the edges of some of the discs $a$ as indicated in the drawing.

This water, which now contains only earth, sand and small gravel and particles in suspension, as well as the metal to be separated, then passes down the grid $c'$ and the metal and other small particles fall through the openings in the grid and drop on to the surface of the mercury below, their weight and momentum carrying them through the layer of thick muddy water E which forms on the top of the mercury, so that none of the precious metal, or only a small amount, is carried away with this mud which is discharged over the end $c^2$ of the box by the flow of water passing through the grid, together with any small light stones or materials which have passed through the channels $a'$.

A draw-off opening $c^5$ is provided at the lowest point of the chamber, which opening can be closed by a plug or cock.

While the process is particularly intended for use in alluvial and placer mining, or in conditions where the metal to be recovered or collected is in a free state, it may also be employed in the treatment of quartz, after the latter has been crushed, so as to bring the metal into a condition suitable for amalgamation by mercury. In this case, the process may be applied before or after the cyanide process, in order to economize the chemicals or to retain what has escaped from them. Furthermore, it may be used, as already indicated, for separating diamonds, rubies and other precious stones when in a free condition. In the latter case the liquid employed will be such that it will not mix with water and has such a density that while the waste and mud will remain on the surface, the diamonds or other stones will sink in it. As examples of such materials I may mention acetylene tetrabromide, methylene iodide and like liquids which have the required density and do not mix with water.

It is also contemplated to use the process for the separation of tin, lead and other metals when in a suitable condition for separation or collection by my process and it is not intended in all cases to effect an amalgamation in the separating or collecting treatment, as the metal may remain free in or on the liquid, the object of the process in all cases being to separate the alluvial or mass treated into its principal component parts, i. e. large stones, gravel and refuse, clay, earth and fine sand, and free or substantially free metal or stones, the latter in all cases being delivered to and retained by the heavy liquid.

While the rotary drum is a very convenient apparatus for use in the preliminary treatment, it is not essential and any other suitable means may be employed to bring the material into a condition suitable for delivery to the strainer or grid, and if the material is originally in such condition, no drum or the like will be required.

To facilitate the passage of the free metal or stones through the grid the latter may be given an oscillating or jerky motion.

According to a modification I can employ as the preliminary sorter, when such is used, a drum of perforated material or having perforated walls, through which the water, sand, fine gravel and metal or stones will pass and fall into the box or chamber below, containing a charge of heavy liquid. In such case, of course, no grid or sieve surface need be provided on the box.

Having now particularly described and ascertained the nature of my said invention and in what manner the same is to be performed, I declare that what I claim is:—

1. The process of recovering metals and precious stones from the minerals containing them, which comprises mixing the minerals with water, and projecting the mixtures of mineral and water with force through air and through a layer of such material mixed with water onto and into an extended body of liquid of relatively high density and not miscible with water, in order to produce penetration into the said liquid to an appreciable depth, and causing the materials to stratify according to density in layers on top of said liquid.

2. The process of recovering metals and precious stones from the minerals containing them, which comprises mixing the minerals with water, projecting the mixture of mineral and water with force through air and through a layer of such material mixed with water onto and into an extended body of liquid of relatively high density and not miscible with water, in order to produce penetration into the said liquid to an appreciable depth, and causing the materials to stratify according to density in layers on top of said liquid, and allowing the surplus water and other materials, of less density than those which it is desired to recover, to gradually over flow.

GEORGES CHARLES EDOUARD FRANÇOIS HANCIAU.